L. WOLF.
HYDROCARBON GAS AND METHOD OF PRODUCING THE SAME.
APPLICATION FILED JUNE 16, 1915.
1,265,573.
Patented May 7, 1918.
3 SHEETS—SHEET 1.
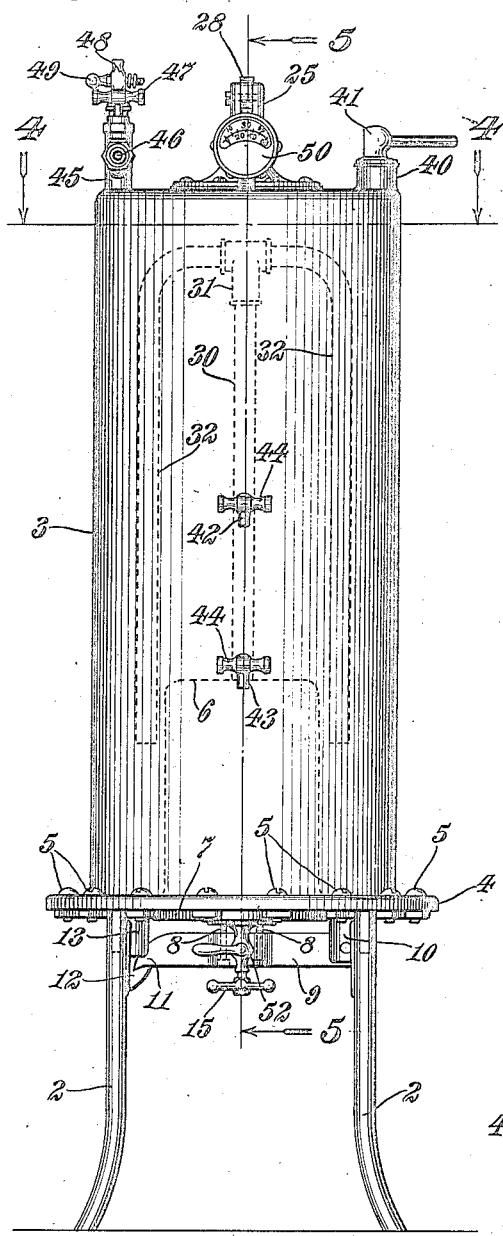
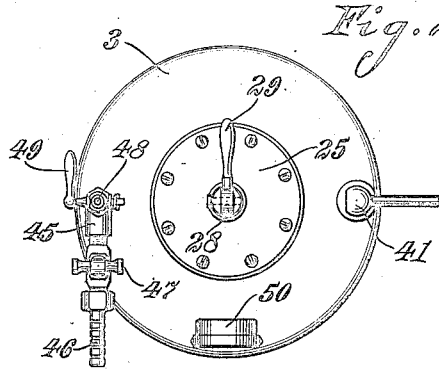
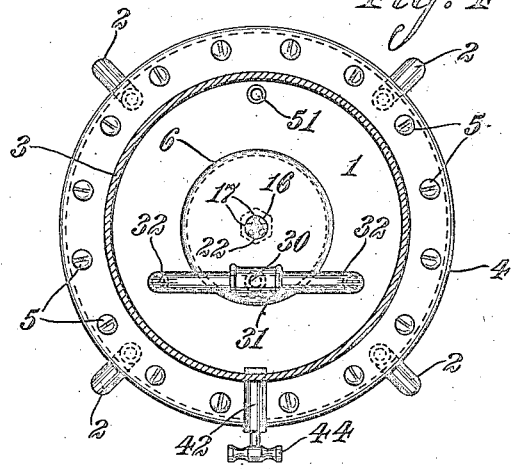
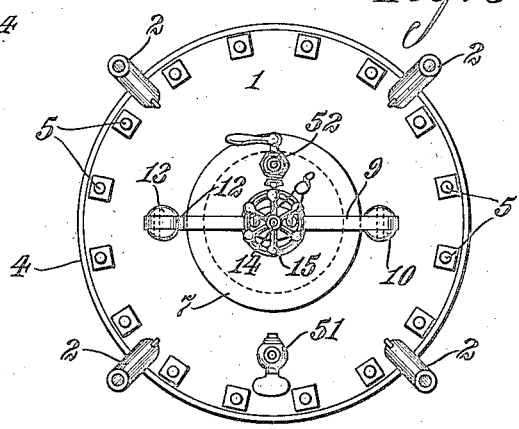
Inventor:
LINUS WOLF,
By John N. Bruninga
His Attorney.

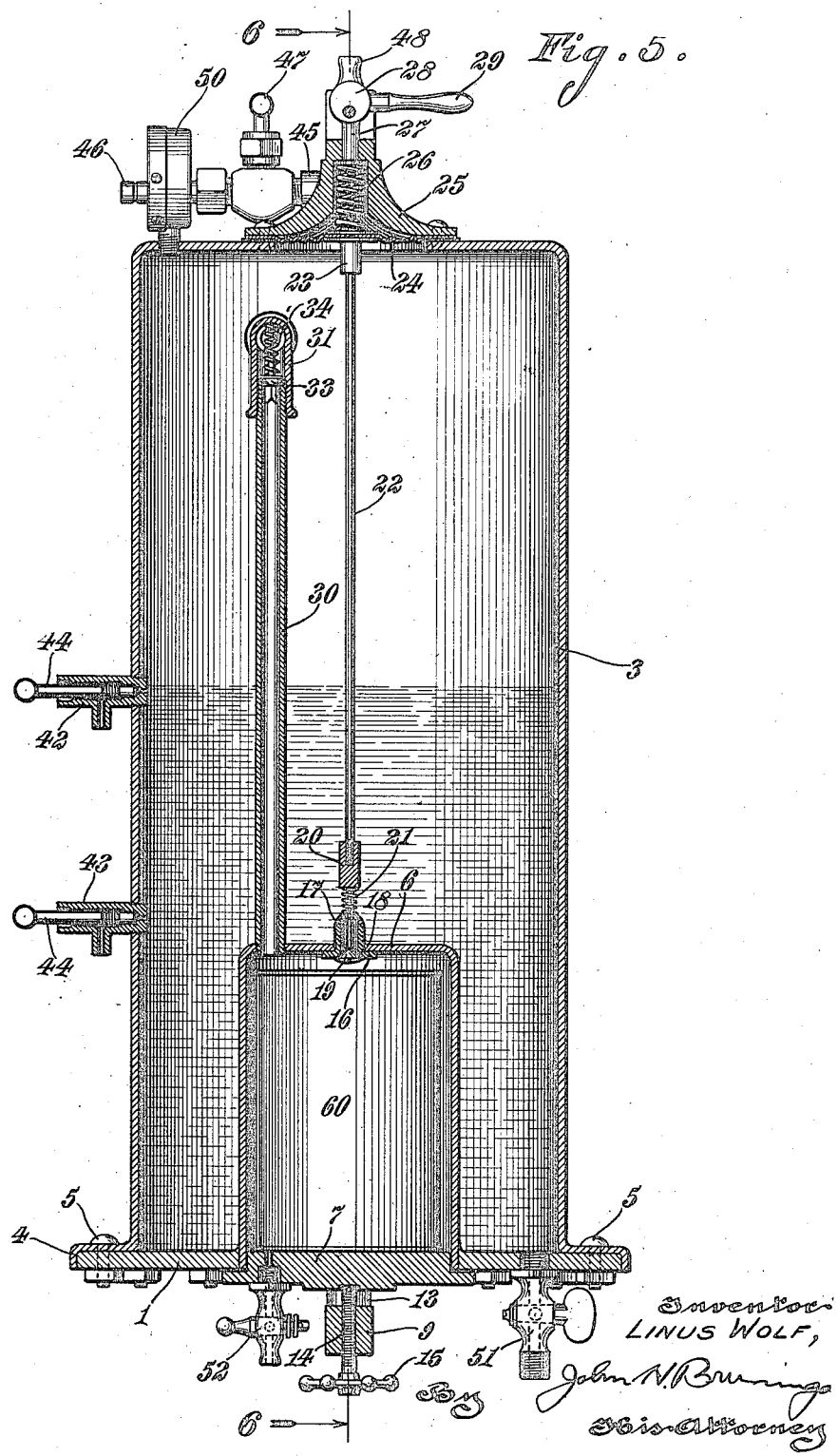

L. WOLF.
HYDROCARBON GAS AND METHOD OF PRODUCING THE SAME.
APPLICATION FILED JUNE 16, 1915.
1,265,573.
Patented May 7, 1918.
3 SHEETS—SHEET 3.
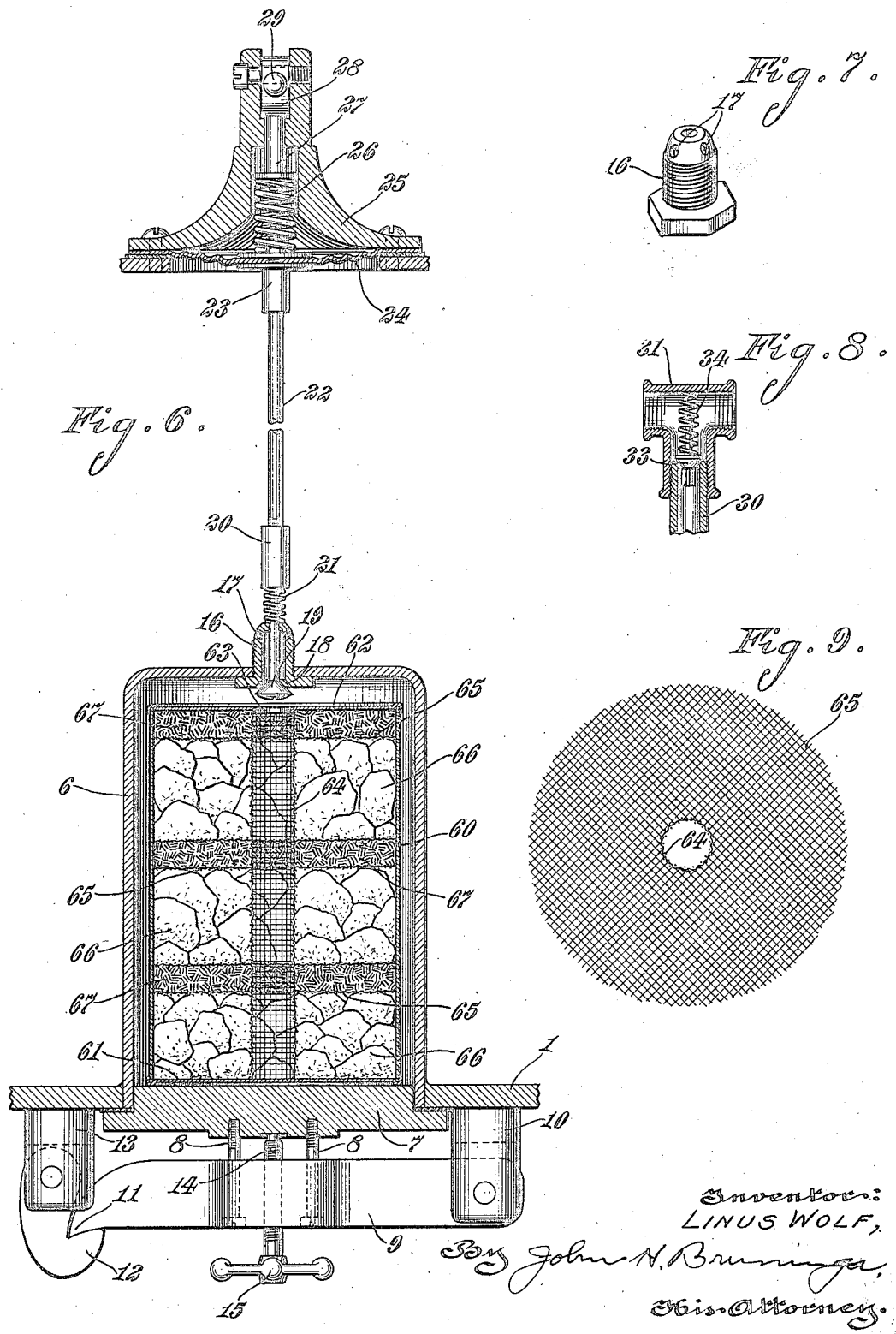
Inventor:
LINUS WOLF,
By John H. Bruninga,
His Attorney.

UNITED STATES PATENT OFFICE.

LINUS WOLF, OF CHICAGO HEIGHTS, ILLINOIS, ASSIGNOR TO THE THERMALENE COMPANY, OF CHICAGO HEIGHTS, ILLINOIS, A CORPORATION OF ILLINOIS.

HYDROCARBON GAS AND METHOD OF PRODUCING THE SAME.

1,265,573.     Specification of Letters Patent.      Patented May 7, 1918.

Application filed June 16, 1915. Serial No. 34,511.

*To all whom it may concern:*

Be it known that I, LINUS WOLF, a subject of the Emperor of Germany, and residing at Chicago Heights, in the county of Cook, State of Illinois, have invented a certain new and useful Improvement in Hydrocarbon Gas and Methods of Producing the Same, of which the following is a specification.

This invention relates to gases, and more particularly, to gases adapted for illuminating and heating.

One of the most efficient gases used for illuminating and heating, and more particularly, for autogenous welding and cutting of metals, is acetylene. This gas, as is well known, is generated from a carbid, such as calcium carbid, by the action of a suitable reagent, such as water. On account of the physical and chemical characteristics of acetylene, and on account of the presence of impurities in commercial calcium carbid, which impurities are carried over into the gas, this gas is objectionable in many respects, and its generation presents many difficulties, some of which are difficult and sometimes impossible to overcome.

The reaction resulting in the formation of calcium carbid is exothermic, that is, heat is evolved upon its conversion into acetylene, this heat evolved amounting to 406 calories per gram of calcium carbid. If no precaution is taken, the gas at the point of generation is liable to become very hot. The temperature may be high enough to cause polymerization, that is, conversion of the acetylene into the higher hydrocarbons, and even into its constituent elements, carbon and hydrogen. The conversion into the higher hydrocarbons causes a decrease in efficiency, while the splitting up into the elements will cause the generation of such a high pressure as to amount to an explosion, for the reason that the reaction resulting in the formation of acetylene is endothermic, and, therefore, considerable heat is generated upon splitting up into the elements. In addition to the detrimental effects on the gas, a high temperature at the generating point has other unfavorable actions. Polymerization will cause a coating of tar or tarry oil on the carbid, which is baked by the heat into a tough skin covering the carbid lumps, so as to prevent proper action of the water thereon, and, therefore, imperfect decomposition. Moreover, the higher the temperature of the generated gas, the greater are the percentages of impurities generated, more especially the sulfur and phosphorus compounds and ammonia, and the more difficult is it to separate these impurities from the gas.

The low specific heat of calcium carbid and acetylene prevents effective cooling of the generator chamber and of the gas. The reaction in the generating chamber results in the formation of lime, which coats the inside of the generating chamber and prevents the conduction of the heat to the water through the walls. It must be kept in mind that the gas is generated in a generating chamber or compartment, and that the absorption of the heat must be by conduction through the generator walls. This is strictly true of the water-to-carbid generators, and broadly also true of carbid-to-water generators.

The instability of the acetylene gas requires a comparatively low pressure and a comparatively low temperature, as the critical temperature and pressure are comparatively low. Acetylene also has a large range for explosive mixtures, the lower and upper limits being respectively three per cent. (3%) and seventy five per cent. (75%). A comparatively small percentage of air added to acetylene, and a comparatively small amount of acetylene added to air will, therefore, produce an explosive mixture. This means that the percentage of air in a Bunsen burner must be low, in order to prevent flareback of the flame, and this, of course, means low efficiency. In welding and cutting torches, however, the oxygen must be in excess, so as to insure perfect combustion, which not only requires waste of oxygen, but this excess of oxygen is also liable to cause an oxidized weld, which is hardened in spots, and, therefore, not easily worked. As an illuminating flame, acetylene lacks in both the red and the yellow.

One of the objects of this invention, therefore, is to devise a novel method of generating gas, in which the above objections are overcome in a simple, novel and effective manner.

Another object is to produce a novel gas, whose physical and chemical characteristics are such as to obviate the above objections.

Another object is to produce a novel gas producing body of cartridge.

Another object is to produce a novel apparatus or generator for producing the gas.

Further objects will appear from the detail description taken in connection with the accompanying drawings, in which:

Figure 1 is a front elevation of a generator embodying this invention;

Fig. 2 is a top plan view;

Fig. 3 is a bottom view;

Fig. 4 is a section on the line 4—4, Fig. 1;

Fig. 5 is an enlarged section on the line 5—5, Fig. 1;

Fig. 6 is an enlarged section on the line 6—6, Fig. 5;

Fig. 7 is a detail perspective of a valve plug;

Fig. 8 is an enlarged detail section of the outlet pipe; and,

Fig. 9 is a detail of one of the separators in the cartridge.

In accordance with this method, the heat evolved by the generation of acetylene from a carbid is absorbed at the point of generation to generate a gas, preferably an oil gas, which is combined with the acetylene to form the resultant gas. This utilization of heat at the point of generation serves to keep the temperature down so that radiation and absorption by the water is not necessarily depended upon. This result is obtained by providing a composite gas producing body consisting of a carbid and a volatile hydrocarbon to be gasified, the hydrocarbon being preferably absorbed by a suitable absorbent, such as sawdust, arranged in alternate layers with the carbid. The combined gases thus formed are cooled together before issuing into the gas chamber, and this causes a removal of the impurities and a combination of the gases into a fixed homogeneous gas. This is accomplished by passing the gases, after generation, through tubes which are cooled by water, so that the impurities are deposited and drained back into the generating chamber, from which they may be removed.

In the accompanying drawings, one form of apparatus is described which is adapted to perform the process and produce the gas. It will be understood, however, that the apparatus may be varied without departing from the spirit of this invention.

Referring now to the accompanying drawings, 1 designates a base supported on suitable legs 2, and 3 is a casing having a flange 4 engaging the base 1 and secured thereto by bolts 5. The casing 3, together with the base and the legs, forms the body of the generator.

Attached to or formed integral with the base 1 is a small casing 6 which is open at its bottom to form a generating chamber. This generating chamber is closed by a plate or a door 7, connected by bolts 8 passing loosely through an arm 9 pivoted on a bracket 10 on the base. The arm 9 has its end hooked and beveled, as shown at 11, to engage a hooked and beveled latch 12 pivoted on a bracket 13, and mounted on the base on the other side of the plate. The plate 7 is flanged to enter the generator chamber, and the arm 9 supporting the plate has a screw 14 threaded therein to bear against the plate, and this screw is provided with a handwheel 15. When the screw 14 is loosened, the arm 9 can be moved up to permit the latch 12 to swing to the left, Fig. 6, thereby permitting the arm and the plate to drop down. When the plate is moved back and the arm is latched in position, this plate can be closed tightly by the screw 14 by turning the hand wheel 15, a gasket being interposed between the plate and the base to form a tight joint, as shown in Fig. 6.

A valve casing 16 is screwed into the top of the generating chamber, and is provided with apertures 17 to permit entrance of the water, and with a valve seat 18 engaged by a valve 19, whose stem extends through the casing and is fixed in a collar 20. A spring 21 is interposed between the collar and the casing to normally hold the valve closed. The collar 20 is threaded internally to receive the threaded end of a rod 22, whose upper end has a head 23 fixed to a diaphragm 24 clamped between the edges of the top of the casing 3 and a flanged casing 25, so that its edges are clamped while its center is free. A spring 26 mounted in the casing 25 bears, at one end, against the diaphragm, and, at its other end, against a plug 27 guided in the casing 25 and adapted to be engaged by an eccentric 28 pivoted in the casing and provided with an operating handle 29. The spring 21 has a greater tension than the diaphragm, so that, when the tension of the spring 26 is relieved by moving the eccentric 28 to the position shown in Fig. 5, the spring 21 will operate to close the valve 19. When, however, the eccentric 28 is moved to the position shown in Fig. 6, so as to place the spring 26 under tension, the combined tension of the spring 26 and of the diaphragm will then be greater than that of the spring 21, so that the valve 19 will now be opened. Increase of pressure in the gas chamber, as hereinafter described, will, however, operate to move the diaphragm to close the valve. The end of the valve 19 is slotted, as shown, so as to permit the same to be rotated by a screwdriver in order to adjust the position of this valve, and, therefore, the opening of the valve port.

The generating chamber has a pipe 30 extending from the top thereof, and this pipe discharges into a T-fitting 31 branching out into lateral downwardly extending branches 32, which are open at their lower ends. The upper end of the pipe 30 is formed to provide a valve seat for a check valve 33, which is closed by a spring 34. With this construction gases can move upwardly through the pipe 30, but cannot return.

The casing 3 is provided with a neck 40 closed by a plug 41, so that the casing may be filled with water. In order to indicate the water level, water level cocks 42 and 43 are provided, these cocks being closed by suitable needle valves 44. A neck 45 is provided with a fitting 46 adapted to be connected to the gas pipe and controlled by a valve 47, and with a pet cock 48 closed by a valve 49. A gage 50 may also be provided. The base 1 is provided with a drain cock 51 to drain the water from the casing, while the plate 7 is provided with a similar drain cock 52 to drain the generating chamber.

The cartridge comprises a casing 60, which may be of sheet metal, paper, or any other suitable material, having ends 61 and 62. The end 62 is provided with a central perforation 63 which opens into a wire mesh or gauze cylinder 64. A series of spacers or separators 65, of wire mesh or gauze, are provided to separate the casing into a number of compartments. The cartridge casing receives alternate layers of a suitable carbid, such as calcium carbid 66, and an absorbent 67 impregnated with a suitable hydrocarbon, such as crude oil. The layers are separated by the wire mesh spacers 65. In practice, the cartridge casing is filled first with a layer of carbid, then a spacer is inserted, then a compressed cake of sawdust impregnated with crude oil is inserted, then another spacer, etc., so that there will be a bottom layer of carbid and a top layer of sawdust impregnated with crude oil. Preferably only one end of the cartridge is perforated, and this perforation may be covered with a label, which can be removed or perforated before the cartridge is placed in the generating chamber.

To start the generator, the arm 29 is moved to the position shown in Fig. 5, so as to close the valve. The pet cock 42 is now opened and the casing filled with water until the latter issues from the pet cock. The pet cock is then closed. A cartridge is now inserted in the generator or cartridge chamber, and the plate 7 closed and clamped tightly in position. To start the apparatus, the arm 29 is now moved to the position shown in Fig. 6, so as to open the valve to permit the water to flow into the generating chamber. The action will now be as follows:

As the water flows into the cartridge, the water will react with the bottom layer of calcium carbid so as to cause acetylene to be generated. This causes a rise in temperature in the cartridge, which causes the oil in the layer above the carbid to be vaporized. The mixture of acetylene and oil now travels upwardly through the cartridge, through the central pipe 30, past the check valve and downwardly through the branches 32 below the water level, this gas bubbling up through the water and being stored in the space above the water, this space forming the gas chamber. The combined gas is thus cooled before it enters the water. As soon as the pressure of the gas in the gas chamber rises above a predetermined value, the diaphragm 24 will be moved against the tension of its spring to close the valve 19 and cut off the supply of water to the generating chamber and thus interrupt the formation of gas. As soon, however, as the pressure of the gas drawn from the gas chamber through the fitting 46 drops below a predetermined value, the spring 26 will again open the valve, and generation will again be resumed.

After the contents of the cartridge have been spent, this cartridge is removed and replaced by another, the procedure being as follows: The water valve is closed by moving the handle 29 to the position shown in Fig. 5. The pet cock 52 is now opened to drain the generating or cartridge chamber. The cartridge chamber is then opened, the cartridge removed, another cartridge replaced, and the plate clamped in position. When originally starting the apparatus, the pet cock 48 is opened until the smell of the gas becomes noticeable, since, as is hereafter described, the gas generated being heavier than air, the air will be displaced, and, in fact, float on top of the gas, so that no air will remain in the generator. Thereafter the pet cock is closed and the operation can be resumed.

In this process, as hereinbefore referred to, the heat evolved by the generation of the acetylene is utilized to gasify the crude oil held by the layer of sawdust. In this way, the heat generated is used and dissipated by the latent heat of the oil. The divisions of the carbid and oil cakes are so proportioned that the temperature is governed so as to cause only vaporization of the lighter oils, such as benzin, naphthalene, kerosene, etc. The temperature is not high enough to vaporize the tar oils, as these are heavy and give a deposit of lamp black. The heavy oils are, therefore, not utilized, but remain in the cartridge. The temperature in the cartridge is, therefore, maintained between 200 and 400 degrees C., depending upon the rapidity of the use of the gas, and the amount of gas which is delivered and generated. It is not intended that an actual boiling shall take place, for, if the temperature is too high, not alone will there be a volatilization of the heavy oils, causing deposits in the pipes, but there will also be an increase in the impurities.

The gases, after generation, pass through the tubes or pipes 30 and 32, which are cooled by the water in the generator and kept at a temperature of from 15 to 20 degrees C. In the passage through these cooled pipes, the impurities are removed in the following manner: Acetylene, as stated above, has a comparatively high specific heat, so that its rate of cooling when passing through cooling pipes will be low. The specific heat of oil gas is, however, only one-fifth of that of acetylene, so that its cooling effect will be five times as great. Now, if two gases, one of a low specific heat and the other of a high specific heat, are passed together along a cooling surface, the temperature of the low specific heat gas will, of course, decrease rapidly, and this will cause a rapid lowering of the temperature of the other gas, so that vapors, etc., suspended therein will be deposited. So in this process the combined gases passing through the pipes will cause a precipitation of the sulfur, phosphorus and silicon compounds and of the ammonia. In order, however, to bring about this precipitation, the temperature must be sufficiently low, that is, as stated above, from 15 to 20 degrees C. If the gases finally issuing from the pipes and the water are too hot, the impurities will not be thrown out.

In this process the acetylene and oil gas generated and cooled in combination will combine in the pipes 30 and 32, after the impurities are separated from the acetylene. In order to bring about this combination, however, the impurities must be separated, and the temperature must be low, that is, from 15 to 20 degrees C. When the temperature of the water is above 43 degrees C., a burning of the oil takes place, and the resultant gas is not a proper combination.

As pointed out above, a gas is produced which is novel in itself, and which has characteristics which distinguish it from acetylene, from oil gas, and also from the usual mixture of these two gases. The density of this gas is higher than that of air, being about 1.1, taking air as unity, as the issuing gas can be seen to sink in air when viewed in a sunbeam. The specific heat is very much lower, being a little over one-fifth that of acetylene. The gas liquefies at between 1400 and 1500 pounds per square inch at room temperature, and, in its liquid state, is non-explosive and stable. The smell of the gas is sweet, and not at all like that of acetylene or oil gas. The flame color is white, but with predominating proportions in the red and yellow parts of the spectrum. The maximum flame temperature is found to be about 3,000 degrees C.

The high density of the gas has various advantages as pointed out heretofore. The gas has more body than acetylene and, does not, therefore, need as much oxygen. Moreover, it mixes better with oxygen. It does not explode as readily as acetylene, and, therefore, can be mixed with greater proportions of air. In a Bunsen burner it is possible to mix as much as thirty-two per cent. (32%) of air without causing a flare-back. It can be gradually turned down without flaring back, and it can be used with a Welsbach mantle to advantage. The upper and lower explosive limits are respectively 12% and 30%. Less gas is required for a given flame than in the case of acetylene, for the reason that the gas is denser and richer, thereby resulting in a higher efficiency. As pointed out above it is entirely stable, being non-explosive, even at high pressures and temperatures, and even when liquefied.

When this gas is used for welding and cutting, it has many advantages. It does not require an excess of oxygen, and, for this reason, does not absorb the carbon from and does not oxidize the iron. The flame is, therefore, soft, producing a soft weld, especially in cast iron. When welding, it is noticeable that the sparks thrown are considerably less than when using acetylene. The gas can be used at a much lower pressure than when using acetylene, due to its higher specific gravity and its greater calorific value. This fact enables the operator to approximate more closely the quantity of oxygen required for the gas to complete combustion, and renders possible a slightly reducing flame. The welding and cutting can not only be done at a less expense than when using acetylene, but more readily and by unskilled operators.

While it is difficult to determine the composition of the gas, it is believed that it is a complex hydrocarbon. The gas is, however, not a loose mixture, as is ordinary acetylene oil gas, but is a fixed gas having its own characteristics and having great stability.

It will, therefore, be seen that the invention accomplishes its objects. In accordance with this method, the generation of the gas does not cause an overheating of the gas or the apparatus, for the reason that the heat generated is utilized at the point of generation to vaporize another substance. All the impurities are separated from the gas, so that there is absolutely no danger of explosion, no corrosive effects on the fittings, nor toxic effects. The spent cartridge does not give off explosive gases, for the reason that the gases which are liable to cause explosion have been separated and are drained off from the generator chamber. The parts are so constructed that there is no liability for air to enter the cartridge and gas chambers when replacing the cartridge or when filling the generator with water. The gas is dry and pure, because all the impurities, as well as the water vapor, have been separated out by a cooling action. There is, therefore, no liability for a deposit of moisture.

In the claims the terms "combine" and "combining" are used. It is, however, to be understood that these terms are to be taken in their broadest sense, that is, to include physical as well as chemical combinations, for the reason that is is not possible to fixedly determine what combination does take place. Moreover, while it has been attempted to explain a theory, it is not insisted upon as being the absolutely correct or necessary one, but is given merely for the purpose of fully disclosing the invention. It is further obvious that various changes may be made without departing from the spirit of this invention. It is, therefore, to be understood that this invention is not to be limited to the specific details described and shown.

Having thus described the invention, what is claimed is:

1. The process of making gas comprising subjecting a carbid to the action of a suitable reagent to form acetylene and utilizing the heat evolved to gasify another carbon compound to combine with the acetylene.

2. The process of making gas from acetylene and a hydrocarbon comprising gasifying the hydrocarbon by the heat evolved by the formation of acetylene from a carbid, and combining the gases.

3. The process of making acetylene-oil gas comprising gasifying an oil by the heat evolved by the formation of acetylene from a carbid, and combining the gases.

4. The process comprising combining acetylene with another gas and cooling the combined gases to remove the impurities therefrom.

5. The process comprising combining acetylene with another gas having a lower specific heat and cooling the combined gases to remove the impurities therefrom.

6. The process comprising combining acetylene with an oil gas and cooling the combined gases to remove the impurities therefrom.

7. The process comprising combining acetylene with an oil gas generated by the heat evolved by the formation of the acetylene and cooling the combined gases to remove the impurities therefrom.

8. The process comprising combining acetylene with another gas generated by the heat evolved by the formation of the acetylene and cooling the combined gases to remove the impurities therefrom.

9. The process comprising combining acetylene formed from a carbid, with an oil gas generated at the point of generation of the acetylene by the heat evolved.

10. The process comprising combining acetylene formed from a carbid, with a gas having a thermal value at the point of generation of the acetylene, and cooling the combined gases.

11. A gas produced by combining with acetylene at the point of generation of the acetylene a hydrocarbon gas generated by the heat evolved.

12. A gas produced by combining acetylene with an oil gas formed at the point of, and by the heat evolved in generation of the acetylene.

13. A gas consisting of a combination of acetylene and oil gas purified by cooling in combination.

14. A gas consisting of acetylene and oil gas formed together as to time and place and combined and purified by cooling in combination.

In testimony whereof I affix my signature this 25 day of May, 1915.

LINUS WOLF.